United States Patent Office 3,634,354
Patented Jan. 11, 1972

3,634,354
THERMOPLASTIC POLYARYL ETHER-SULPHONES
Gerhard Darsow, Krefeld-Uerdingen, Ludwig Bottenbruch, Krefeld-Bockum, and Hermann Schnell, Krefeld-Uerdingen, Germany, assignors to Farbenfabriken Bayer Aktiengesellschaft, Leverkusen, Germany
No Drawing. Filed July 22, 1969, Ser. No. 843,757
Claims priority, application Germany, Aug. 4, 1968,
P 17 95 120.1
Int. Cl. C08g 33/10
U.S. Cl. 260—49  3 Claims

ABSTRACT OF THE DISCLOSURE

Thermoplastic, flame-proof resins comprising polyaryl ether sulphones substantially consisting of structural units of the following Formulae I, II and III:

(I) 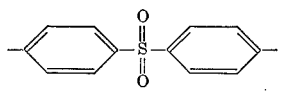

(II) —O—Ar—O—

(III) 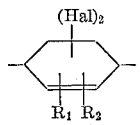

in which the symbols denote:

Ar=a bivalent aromatic radical;
$R_1$ and $R_2$=hydrogen or identical or different alkyl or alkoxy radicals with 1–4 carbon atoms;
Hal=chlorine, fluorine or bromine.

These polyaryl ether sulphones are obtained by reacting molar amounts of (a) mixtures of 4,4'-dihalo-diphenyl-sulphones and tetrahalobenzenes and (b) of dialkali metal phenolates in strongly polar organic solvents at temperatures between about 60° and 170° C.

---

The term polyaryl ether sulphones comprises high molecular, soluble, thermoplastic compounds which consist of approximately equal numbers of structural units of the following Formulae I and II (I) 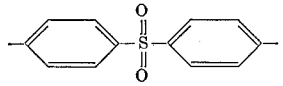

(II) —O—Ar—O—

The structural units of the Formula I are obtained by subtraction of the halogen atoms from 4,4'-dihalophenyl-sulphones, and the structural units of the Formula II are obtained by subtraction of the hydroxyl hydrogen atoms of the bivalent phenols explained in detail further below. The symbol Ar in the Formula II therefore denotes a bivalent aromatic radical.

The known polyaryl ether-sulphones are obtained by reacting molar amounts of 4,4'-dihalo-diphenyl-sulphones and dialkali metal phenolates in strongly polar organic solvents at elevated temperatures (cf. French patent specification No. 1,407,301).

The present invention relates to modified polyaryl ether-sulphones which are distinguished from the known polyaryl ether-sulphones by an improved flame resistance. The obvious way of achieving an increased flame resistance of the polyaryl ether-sulphones by reacting the dihalo-diphenyl-sulphones with dialkali metal salts of halogenated diphenols fails because the reactivity of the halogenated phenolates is strongly hindered.

The polyaryl ether-sulphones according to the invention contain, in addition to the structural units of the above Formulae I and II, structural units of the following Formula III (III) 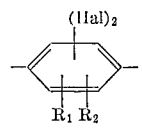

in which the symbols denote:

$R_1$ and $R_2$=hydrogen or identical or different alkyl or alkoxy radicals with 1–4 carbon atoms;
Hal=chlorine, fluorine or bromine.

The structural units of the Formula III replace part of the structural units of the Formula I. The sum total of the structural units of the Formula I and III preferably consists of 5–80% of structural units of the Formula III. The structural units (I)+(II) and (III)+(II) may be distributed randomly or in blocks in the polymer chains.

According to the invention the novel modified polyaryl ether-sulphones are obtained by reacting molar amounts of (a) mixtures of 4,4'-dihalo-diphenyl-sulphones and a tetrahalobenzene and (b) dialkali metal phenolates in strongly polar organic solvents at temperatures between about 60° and 170° C., the 4,4'-dihalo-diphenyl-sulphones and the tetrahalobenzenes being preferably used in a molar ratio of from about 95:5 to about 20:80. Surprisingly, only two halogen atoms of the tetrahalobenzene react so that the tetrahalobenzene, similarly to the dihalo-diphenyl-sulphones, takes part in the synthesis of the high-molecular polyaryl ether chains as a bifunctional aromatic halogen compound by reacting with the dialkali metal phenolates, while the two non-reacting halogen atoms of the tetrahalobenzene give rise to an increase of the flame resistance of the polyaryl ethers. Hence follows that the flame resistance of the products is the higher, the higher is the proportion of co-condensed dihalophenyl radicals.

The average molecular weight of the novel polyaryl ethers may amount from about 5,000 to about 150,000, preferably from about 10,000 to about 100,000.

When the dihalo-diphenyl-sulphone and the tetrahalobenzene are simultaneously present during the reaction with the dialkali metal phenolates one obtains products, wherein the structural units are randomly distributed in the chains; however when the dihalo-diphenyl sulphone alone or the tetrahalobenzene alone is first reacted with the dialkali metal phenolate and subsequently the tetrahalobenzene or the dihalo-diphenyl-sulphone respectively, one obtains block polymers.

Tetrahalobenzenes in the meaning of the invention are compounds of the general Formula IV

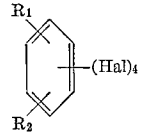

in which $R_1$ and $R_2$ denote either hydrogen or identical or different alkyl or alkoxy radicals with 1 to 4 carbon atoms;
Hal means chlorine, fluorine or bromine.

Examples of compounds of this type are: 1,2,4,5-tetrachlorobenzene, 1,2,3,5-tetrachlorobenzene, 1,2,3,4 - tetrachlorobenzene, 1,2,4,5 - tetrachloro-3,6-dimethylbenzene, 1,2,4,5-tetrachloro-3,6-dimethoxybenzene, 1,2,3,4 - tetrafluorobenzene, 1,2,4,5-tetrabromobenzene, but also tetrahalobenzene with different halogen atoms, e.g. 1,4-dibromo-2,5-dichlorobenzene, 1,4-difluoro-2,5-dibromobenzene.

Suitable dihalo-diphenyl sulphones are, for example, 4,4'-dichloro-diphenyl-sulphone and 4,4'-difluorodiphenyl-sulphone.

Suitable diphenols are mononuclear diphenols, such as hydroquinone or resorcinol, furthermore polynuclear aromatic dihydroxy compounds, such as e.g. dihydroxy-diphenyls and dihydroxy-naphthalenes, but also bisphenols of the general Formula V

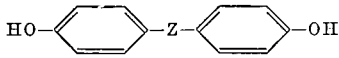

in which Z denotes a bivalent aliphatic, cycloaliphatic or araliphatic radical with 1–8 carbon atoms or —O—, —S—, —SO—, —SO$_2$— or —CO—.

Examples are: bis-(4-hydroxyphenyl)-methane, 1,1-bis-(4-hydroxyphenyl)-cyclohexane, bis-(4-hydroxyphenyl)-phenylmethane, 4,4'-dihydroxydiphenyl-ether, -sulphide, -sulphoxide, -sulphone, 4,4'-dihydroxy-benzophenone, but preferably 2,2-bis-(4-hydroxyphenyl)-propane and 4,4'-dihydroxydiphenyl.

The aromatic nuclei may contain further substituents in addition to the hydroxyl groups, for example, alkyl and alkoxy groups with 1–4 carbon atoms, with the proviso that these substituents do not impair the reactivity of the hydroxyl group by stearic or any other hindrance.

Suitable cations for the diphenolates are those of the metals of the first main group of the Periodic System. The sodium and potassium salts are preferred.

Examples of suitable strongly polar organic solvents are diethyl sulphoxide, dimethyl-sulphone, diethyl-sulphone and tetramethyl-sulphone, but preferably dimethyl sulphoxide.

To carry out the process, the mixture of tetrahalobenzene and 4,4'-dihalodiphenyl-sulphone is introduced together with an equivalent amount of dialkali metal phenolate into one of the aforesaid solvents and reacted at an elevated temperature with the elimination of equimolar amounts of alkali metal halide to give a high-molecular polyaryl ether-sulphone. To obviate oxidative side reactions, the reaction is carried out in an inert gas atmosphere, for example, nitrogen. If a polyether of high molecular weight is desired, the water content of the reaction mixture must be below about 0.3 percent by weight.

The alkali metal salts of some bisphenols can be freed from the adherent water only with difficulty and it is frequently troublesome to reduce the water content of the reaction mixture to below 0.3 percent by weight in accordance with the method described above; for this reason the dialkali metal phenolates are preferably prepared in situ by dissolving the diphenol in a sufficient amount of the polar solvent used for the subsequent reaction in an apparatus which is continuously rinsed with nitrogen, adding the stoichiometric amount of alkali metal hydroxide in solid form or in an aqueous solution, heating the mixture for some time, for example, 4 to 8 hours at about 120 to about 170° C. and thus distilling off the water contained in the system. In order to achieve a more rapid and complete removal of the water, it is expedient to add an additional solvent, for example, benzene, toluene or chlorobenzene and to distil off the water from the mixture azeotropically with the additional solvent, optionally under reduced pressure.

The cooled solution of the phenolate in the polar solvent is admixed with the stoichiometric amount of a mixture of the tetrahalobenzene with 4,4'-dihalo-diphenylsulphone, optionally dissolved in an inert solvent such as toluene or chlorobenzene. Condensation is then carried out by heating this mixture at the aforesaid reaction temperatures, for example, for 1–6 hours. The alkali metal halide formed in the condensation reaction is precipitated in the form of an insoluble salt; it can be separated from the solution in a simple way by filtering off. After cooling, the solution is mixed either with water or with a lower alcohol, such as methanol or ethanol. The polyaryl ether-sulphone separates in solid form. It is isolated and thoroughly washed with water in order to remove residues of salt and solvent.

It is also possible to react a mixture of two or more dialkali metal phenolates with an equimolar mixture of tetrahalobenzene and 4,4'-dihalo-diphenyl-sulphone.

The novel modified polyaryl ether-sulphones which can be prepared according to the invention have a good stability to oxidative damage and to acidic or basic hydrolysis. They also have good mechanical properties and dimensional stability over a wide range of temperature. Their good flame resistance must be emphasized. They can be used in the form of films, fibers, compression and injection mouldings, varnishes and coatings in all cases where advantageous mechanical properties and a high thermal stability are important, besides a good flame resistance, for example, in the textile and electrical industries, in road and rail vehicle construction, in shipbuilding and aircraft construction.

EXAMPLE 1

114.1 g. (0.5 mol) 2,2-bis-(4-hydroxyphenyl)-propane are placed in a metal vessel of 2 litres capacity and dissolved in 700 ml. dimethyl sulphoxide. The vessel is fitted with a gas feed tube, a stirrer, a thermometer, a reflux condenser and a water receiver filled with toluene. A slow nitrogen current is then passed through the apparatus in order to generate an inert gas atmosphere. There are added 40.0 g. (1 mol) sodium hydroxide in the form of tablets or an equivalent water-containing product and 250 ml. toluene. The mixture so obtained is heated at 140° C. for about 6 hours, while the water present in the mixture and resulting from the salt formation is continuously distilled off azeotropically with the toluene. After separation of the water, the toluene is recycled to the reaction mixture. When the water has been completely removed from the reaction mixture, the toluene is distilled off, the remaining solution is heated to 160° C., and at the same temperature there is added first a solution of 71.8 g. (0.25 mol) of 4,4'-dichloro-diphenylsulphone dissolved in 150 ml. of anhydrous chlorobenzene and then a solution of 54.0 g. (0.25 mol) of 1,2,4,5-tetrachloro benzene dissolved in 150 ml. of anhydrous chlorobenzene.

The mixture is then heated at 160° to 170° C. for 2 to 4 hours while stirring whereupon the sodium chloride formed in the condensation rapidly separates. When the reaction is completed, the sodium chloride is filtered off and the residual solution is slowly poured into an excess of alcohol which is rapidly stirred. The reaction product separates as a white powder. It is filtered off with suction and dried in a vacuum.

The polyether so obtained has a relative viscosity $\eta_{rel}=1.18$ (measured on a solution of 0.5 g. in 100 ml. methylene chloride at 25° C.). It contains 8.8 percent by weight chlorine. Foils produced from this material exhibit a substantially improved flame resistance, compared with a polycondensate obtained from 2,2-bis-(4-hydroxyphenyl)-propane and 4,4'-dichloro-diphenyl-sulphone.

EXAMPLE 2

114.1 g. (0.5 mol) 2,2-bis-(4-hydroxyphenyl)-propane and 40.0 g. (1 mol) of sodium chloride in solid form are placed in an apparatus according to Example 1 and dissolved in 700 ml. dimethyl sulphoxide. 300 ml. chlorobenzene are then added. The mixture is heated at 140° C. for 4 to 6 hours whereby the water resulting from the salt formation is removed by azeotropic distillation with the chlorobenzene. When the solution is anhydrous, it is heated to 150°–160° C., and at the same temperature there is added first a solution of 114.9 g. (0.4 mol) of 4,4'-dichlorodiphenyl-sulphone in 200 ml. of anhydrous chlorobenzene, and then a solution of 21.6 g. (0.1 mol) of 1,2,4,5-tetrachlorobenzene and 50 ml. of anhydrous chlorobenzene. The mixture is then heated at 160–170° C. for 2 to 4 hours while stirring. The mixture is then filtered while still hot and poured into an excess of alcohol which is rapidly stirred. The reaction product separates as a white powder. It is filtered off with suction and dried in a vacuum.

The polyether so obtained has a relative viscosity $\eta_{rel}=1.24$ (measured on a solution of 0.5 g. in 100 ml. methylene chloride at 25° C.). It contains 3, 4 percent by weight chlorine. Foils produced from this material have a good flame resistance, unlike a polycondensate obtained from 2,2 - bis - (4 - hydroxyphenyl)-propane and 4,4'-dichlorodiphenyl-sulphone.

We claim:
1. A thermoplastic polyaryl ether-sulphone having an average molecular weight of from about 5,000 to about 150,000, said sulphone consisting essentially of the following recurring structural units:

(I) 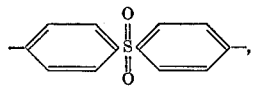

(II) —O—Ar—O— and

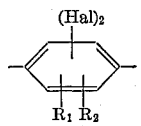

wherein Ar is a bivalent aromatic radical free of reactive substituents, $R_1$ and $R_2$ are individually hydrogen or identical or different alkyl or alkoxy moieties having from 1 to 4 carbon atoms and Hal is chlorine, fluorine or bromine and the total number of structural units of Formula III is from about 5 to about 80% of the total number of structural units represented by the sum of the structural units of Formulae I and III.

2. The thermoplastic polyaryl ether-sulphone of claim 1 having an average molecular weight of from about 10,000 to about 100,000.

3. The thermoplastic polyaryl ether-sulphone of claim 1 in which the number of structural units represented by the sum of the structural units of Formulae I and III is approximately the same as the number of structural units of Formula II.

References Cited
UNITED STATES PATENTS 3,332,909   7/1967   Farnham et al. _____ 260—47
3,481,885   11/1969   Radlmann et al. _____ 260—2.2

WILLIAM H. SHORT, Primary Examiner

L. L. LEE, Assistant Examiner

U.S. Cl. X.R.

260—30.8 R, 30.8 DS, 33.8 R